US008178187B2

(12) United States Patent
Ikeda et al.

(10) Patent No.: US 8,178,187 B2
(45) Date of Patent: May 15, 2012

(54) WATER PRESSURE TRANSFER ARTICLE

(75) Inventors: Wataru Ikeda, Shizuoka (JP); Nobuyuki Otaki, Shizuoka (JP); Tomomi Kiyotaki, Shizuoka (JP)

(73) Assignee: Taica Corporation, Tokyo (JP)

( * ) Notice: Subject to any disclaimer, the term of this patent is extended or adjusted under 35 U.S.C. 154(b) by 700 days.

(21) Appl. No.: 10/597,951

(22) PCT Filed: Dec. 7, 2004

(86) PCT No.: PCT/JP2004/018198

§ 371 (c)(1), (2), (4) Date: Aug. 14, 2006

(87) PCT Pub. No.: WO2005/077676

PCT Pub. Date: Aug. 25, 2005

(65) Prior Publication Data

US 2007/0154685 A1 Jul. 5, 2007

(30) Foreign Application Priority Data

Feb. 18, 2004 (JP) ................................. 2004-040870

(51) Int. Cl.
*B32B 7/04* (2006.01)

(52) U.S. Cl. ..................................... 428/195.1; 428/207

(58) Field of Classification Search ........................ None
See application file for complete search history.

(56) References Cited

U.S. PATENT DOCUMENTS 3,907,974 A 9/1975 Smith
4,029,831 A * 6/1977 Daunheimer ................ 427/264
4,396,448 A * 8/1983 Ohta et al. .................... 156/219
4,490,410 A 12/1984 Takiyama et al.
5,354,367 A 10/1994 Pennaz
5,432,258 A 7/1995 Yoshimura
5,560,796 A 10/1996 Yoshimura
6,551,392 B1 4/2003 Otaki et al.
6,554,940 B2 4/2003 Otaki et al.
6,653,394 B1 * 11/2003 Meisenburg et al. ......... 524/589
6,852,394 B2 2/2005 Otaki et al.
6,902,642 B2 6/2005 Kawaharada et al.
2003/0108675 A1 * 6/2003 Kawaharada et al. ........ 427/256

(Continued)

FOREIGN PATENT DOCUMENTS

JP 56-082256 A 7/1981

(Continued)

OTHER PUBLICATIONS

Wypych, George. "Handbook of Fillers". ChemTec Publishing, (2000). pp. 62-71.*

(Continued)

*Primary Examiner* — David Sample
*Assistant Examiner* — Prashant J Khatri
(74) *Attorney, Agent, or Firm* — Pearne & Gordon LLP

(57) ABSTRACT

A decorative layer is formed by applying an ultraviolet ray hardening resin composite on a print pattern of a transfer film and transferring the print pattern on a surface of an article under water pressure in the state where the print pattern is activated by the ultraviolet ray hardening resin composite to recover the adhesion thereof, but the ultraviolet ray hardening resin composite is wholly united with the print pattern and hardened by an ultraviolet ray and the decorative layer has a glossy variation and/or touch feeling in accordance with a combination of the ultraviolet ray hardening resin composite united and hardened with the print pattern and a composition of the print pattern.

6 Claims, 5 Drawing Sheets

U.S. PATENT DOCUMENTS

| | | | |
|---|---|---|---|
| 2007/0051458 | A1 | 3/2007 | Ikeda et al. |

FOREIGN PATENT DOCUMENTS

| | | | | |
|---|---|---|---|---|
| JP | 56166090 | A | | 12/1981 |
| JP | 64-022378 | A | | 1/1989 |
| JP | 04-197699 | A | | 7/1992 |
| JP | 04197699 | A | | 7/1992 |
| JP | 5016598 | A | | 1/1993 |
| JP | 06-166300 | A | | 6/1994 |
| JP | 06166300 | A | | 6/1994 |
| JP | 7276899 | A | | 10/1995 |
| JP | 200071693 | A | | 3/2000 |
| JP | 2001277790 | A | | 10/2001 |
| JP | 2001-315287 | A | * | 11/2001 |
| JP | 2002172895 | A | | 6/2002 |
| JP | 2003-065668 | A | | 3/2003 |
| WO | WO98/47973 | A1 | | 10/1998 |
| WO | WO98/55552 | A1 | | 12/1998 |
| WO | WO0032666 | A1 | * | 6/2000 |

OTHER PUBLICATIONS

Machine Translation of JP 2001-315287, Retrieved Jan. 19, 2011.*

Teikoku Printing, “UV Ink Selector—UV PAL”—http://www.teikokuink.com/en/product/inkselector_uv.html.

Teikoku Printing “Q&A Regarding Printing and Forming”—http://www.teikokuink.com/en.product/printfaq.html#q2-01.

* cited by examiner

WATER PRESSURE TRANSFER ARTICLE

TECHNICAL FIELD

This invention relates to a water pressure transfer article having a decorative layer thereon by transferring a print pattern on a water soluble film under water pressure. The decorative layer can form the outermost surface of the article without any application of a surface protection layer on the decorative layer

BACKGROUND OF TECHNOLOGY

The water pressure transfer method is one in which a transfer film having a predetermined water-insoluble print pattern applied onto a water-soluble film is floated on a water surface within a transfer tub while the water-soluble film is made wet with the water and an article (a transferred body or a body to be pattern-transferred) is immersed into the water within the transfer tub while it contacts the transfer film whereby the print pattern of the transfer film is transferred onto the surface of the article using the water pressure to thereby form a decorative layer. Generally, since the ink of the print pattern is in a dry state because of the transfer film having the print pattern previously printed and formed on the water-soluble film, it is required to apply an activation agent or a thinner to the print pattern of the transfer film on the transfer operation so as to activate the ink of the print pattern in order to get the same wet state of the ink (the state where it has an adhesion) as the state of the ink immediately after being printed. This is generally referred to as activation. In addition thereto, in order to provide wear resistance, solvent resistance, medicine resistance and weather resistance, etc. to the decorative layer formed on the surface of the article, it is necessary to form a transparent surface protection layer (topcoat layer) on the decorative layer.

With the surface protection layer formed on the decorative layer, since, the whole surface of the article has gloss provided thereon so as to have a design depth given thereto and therefore, there is imparted a kind of high-class feeling such as a polished one on the product which is the water pressure transfer article with the result that there is provided an effect of design expression. However, the whole appearance surface has the uniform glossy feeling and for example, there cannot be expressed a true wood feeling or a qualitative feeling similar to the quiet taste and the elegant simplicity in a grain pattern to cause the limit of design expression. On the other hand, even if the decorative layer is exposed without any surface protection layer formed thereon, there cannot be necessarily expressed the true wood feeling or the qualitative feeling similar to the quiet taste and the elegant simplicity and even though this can be expressed, the product has the poor wear resistance, solvent resistance, medicine resistance and weather resistance, which cannot become the final product. Thus, in practice, the surface protection layer has been applied to the product at the sacrifice of the design expression.

With the surface protection layer formed on the decorative layer, in some cases, there is produced a slippery feeling when a person contacts the surface thereof or a low grade feeling and therefore no surface protection layer might be applied to the decorative layer in one technique. However, in the same manner as the aforementioned design expression, in order to obtain the wear resistance, solvent resistance, medicine resistance and weather resistance, the surface protection layer has been applied to the product at the sacrifice of the design expression.

Such being the case, the applicant considers that it will probably be very difficult to solve the problems such as the aforementioned design expression and the surface feeling and had tried to solve various subjects in the water pressure transfer techniques problems while these problems such as the design expression and the surface feeling are shelved.

In one prior art, the surface protection layer is formed by applying by spray urethane 2 liquid type coating material, acrylics lacquer type coating material or ultraviolet ray hardening type coating material onto the decorative layer and then irradiating an ultraviolet ray on the ultraviolet ray hardening type coating material to thereby harden the coating material.

In this process, however, the decorative layer itself has the solvent resistance not improved, but the surface protection layer (the topcoat layer) to overcoat the decorative layer has the wear resistance, solvent resistance, etc., born for the decorative layer. Since the urethane 2 liquid type coating material is applied after transferring the print pattern and then water-washing and drying the print pattern, it will take relatively longer time to perform these processes and in addition thereto, since the drying is done while exposed to a hot wind, dust will be possibly adhered onto the decorative layer, which disadvantageously lowers the appearance of the decorative layer.

In a second prior art, there has been proposed a method in which water pressure transfer of the print pattern and formation of the surface protection layer are carried out at the same time (see the first patent document). This method is the one in which a transfer film with a protection layer is formed by applying a transparent or semi-transparent surface protection layer of water-insoluble resin on a water-soluble film and then a water-insoluble print layer on the surface protection layer and the transfer film with the protection layer is transferred under water pressure onto an article (a body to be pattern-transferred).

According to this method, since the surface protection layer and the print layer on the water-soluble film are simultaneously transferred on the surface of the article when it contacts the transfer film using water pressure on the water pressure transfer operation, this method can omit the steps of applying and hardening the protection coating material after the transfer process, which have been required in the first-mentioned conventional art, and can avoid dust from adhering between the decorative layer and the surface protection layer.

In this manner, this method can be advantageously used because the surface protection layer is formed at the same time when the print layer is transferred whereby the steps of operation can be simplified and in addition thereto the appearance of the decorative layer is never deteriorated and also the surface protection layer can provide the wear resistance to the surface of the print layer of the article to thereby physically protect it because the surface protection layer is formed of a protection agent of low solvent resistance such as butyl-methacrylate or ethyl-methacrylate, but the surface protection layer disadvantageously has the poor chemical protection because it is easily deteriorated when it contacts various solvents or medicines.

There has been proposed another prior art that is similar to the second prior art, but is different from the latter in that the material for the surface protection layer of the second prior art is replaced by a resin to be hardened by an ultraviolet ray, etc (see the patent document 2).

In the third prior art, since the resin hardened by the ultraviolet ray etc. is used for the surface protection layer, it will physically and chemically protect the decorative layer in an effective manner, but it has some undesirable disadvantages when the adhesion of the print pattern, which is the uppermost surface of the transfer film is recovered or reproduced as described later.

More particularly, although it is common on the aforementioned first to third prior arts, an activation agent or a thinner is applied to the print pattern of the transfer film to recover the adhesion of the print pattern when the transfer should be carried out, but since the activation agent or the thinner has an organic solvent contained therein, the time in which the solvent ingredient completely volatilizes and the drying condition are required to be considered as the process conditions and an adverse influence may be provided to the quality of the water pressure transfer article if the solvent ingredient remains in the print layer after the transfer of the print pattern. Furthermore, since the organic solvent is emitted into the atmosphere during the operation or inhaled by the human body, using the organic solvent for activating the print pattern causes organic air pollution or health injury of laborers and this becomes such a problem as should be solved immediately.

As the inventors tried to directly apply such an ultraviolet ray hardening type coating material as used in the first prior art, which is also an eco-friendly coating material, they could discover the recovery of temporary adhesion of the ink in the print pattern of the transfer film, but also find that when it tries in a continuation work during the water pressure transfer process, it becomes poor transfer due to the reduced adhesion of the print pattern. It has been discovered that as the same trial is performed using an ultraviolet ray hardening type ink which contains the same ultraviolet ray hardening resin composite as the ultraviolet ray hardening type coating material does, but contains no coloring agents, the adhesion of the ink in the print pattern can be recovered and that the transfer can be performed without reduction of the adhesion even during the transfer process.

In case of the water pressure transfer, not only the ink in the print pattern has the wet state returned so as to recover the adhesion of the ink, but also the water-soluble film having the print pattern supported thereon is made also wet with the water in the transfer tub whereby both of the print pattern and the water-soluble film are required to be easily attached onto and around the surface of the article when it is forced into the water. Thus, the article should be forced underwater at the time when the wet states of both of the print pattern and the water-soluble film are obtained. The adhesion of the print pattern to attach the print pattern onto the article should be maintained until the transfer is completed.

The inventors surmise that the difference between these trial results is caused by the difference between the composition of the ultraviolet ray hardening type coating material and that of the ultraviolet ray hardening type ink as the products different from their usage even though they contain the same ultraviolet ray hardening resin composite. In addition thereto, they surmise that there is the difference in that the ultraviolet ray hardening type coating material contains low boiling point solvent, but the ultraviolet ray hardening type ink generally contains less solvent, and therefore, as the ultraviolet ray hardening type coating material is applied to the print pattern, the original adhesion of the print pattern can be recovered by the solvent in the coating material, but the adhesion will be reduced due to the evaporation of the solvent when the transfer is carried out and since the ultraviolet ray hardening type ink has no solvent, any non-solvent composite will serve to recover the print pattern. The applicant has proposed the method to solve various problems of the prior arts by repeating various experiments under the aforementioned suppositions.

This method of solving the problems comprises a step of applying a non-solvent type ultraviolet ray hardening resin composite on the print pattern of the transfer film to recover the adhesion of the print pattern by a non-solvent activation component of the non-solvent ultraviolet ray hardening type resin composite, a step of forcing the article underwater together with the transfer film so as to force the print pattern containing the ultraviolet ray hardening type resin composite onto the surface of the article and a step of irradiating an ultraviolet ray on the article on which the print pattern containing the ultraviolet ray hardening type resin composite is transferred whereby the ultraviolet ray hardening type resin composite is hardened in the state where the ultraviolet ray hardening type resin is wholly united with the print pattern to form a decorative layer.

The applicant confirms while the invention is completed that the decorative layer itself of the water pressure transfer article obtained by this water pressure transfer method has at least the adhesion to the surface of the article and the solvent resistance and therefore can be commercially produced even without any surface protection layer.

Also, the applicant confirms that the water pressure transfer article obtained by this water pressure transfer method has the expression of design variation of the decorative layer accomplished.

Initially explaining the expression of design variation of the decorative layer, when there is observed the decorative layer formed by transferring the print pattern of grain, for example under water pressure, a glossy feeling can be observed in a layer portion where an early wood portion is expressed, but no glossy feeling is seemingly observed in a layer portion where a late wood portion is expressed by printing black ink of high density. The applicant finds that the existence of the different glossy feelings adjacent to each other can impart a cubic affect of real wood to the surface of the article.

It will be guessed that the variation in the glossy feeling will occur due to the following causes. That is, since the ultraviolet ray hardening resin composite coated on the surface of the transfer film for recovering the adhesion of the print pattern on the water pressure transfer is absorbed by the coloring pigments or the like in the black ink, the ultraviolet ray hardening resin composite is hardened by the ultraviolet ray so as to expose a particle feeling (fine unevenness) of the pigments in the position (layer portion) where the black ink is transferred at high density whereby the glossy feeling is reduced, but in the position where the ink other than the black ink is transferred and the black ink is transferred at lower density, the ultraviolet ray hardening resin composite is hardened by the ultraviolet ray while it is seldom oil-absorbed by the pigments so as to be buried between the components of the pigments whereby fine unevenness is reduced so as to maintain the glossy feeling. The applicant supposes that the variation in the glossy feeling will be generated by the aforementioned causes. Thus, thereafter, various confirmation experiments are repeated in view of the supposition.

[Patent Literature 1] JP04-197699A

[Patent Literature 2] JP2003-305998A

A first fundamental object of the invention is to provide a water pressure transfer article adapted to impart adhesion and mechanical and chemical surface protection functions such as solvent resistance, etc., to a decorative layer itself on the article without any surface protection layer (topcoat layer) formed thereon and also adapted to improve a glossy variation on the surface of the decorative layer.

Another object of the invention is to provide a water pressure transfer article adapted to impart a three dimensional or cubic effect to a decorative layer based on a difference of glossy feelings by having a portion where there is the glossy feeling on the decorative layer and a portion where there is reduced the glossy feeling on the decorative layer.

Further object of the invention is to provide a water pressure transfer article adapted to impart a three dimensional or cubic effect to a decorative layer based on a difference of glossy feelings so as to have real wood sense, qualitative sense, reality sense, novel sense, strange sense and effects such as the quiet taste and the elegant simplicity whereby there can be imparted many design expressions, which the prior art has not had.

Further object of the invention is to provide a water pressure transfer article adapted to impart mechanical and chemical surface protection functions to a decorative layer itself on the article and to improve a glossy variation on the surface of the decorative layer.

DISCLOSURE OF THE INVENTION

A fundamental feature of the invention is to provide a water pressure transfer article having an outermost decorative layer formed thereon by transferring a print pattern on a water-soluble film under water pressure characterized by having glossy variation and/or touch feeling imparted to the outermost decorative layer in accordance with a combination of ultraviolet ray hardening resin composite applied on the print pattern to be wholly united with the print pattern and hardened by an ultraviolet ray and a component of the print pattern. The ultraviolet ray hardening resin composite coated on the print pattern serves to recover the adhesion of the print pattern on a water pressure transfer operation, but is used only for a purpose of imparting solvent resistance etc., in case that the print pattern itself has the adhesion.

A first dependent feature of the invention is to provide a water pressure transfer article having an outermost decorative layer formed thereon by transferring a print pattern on a water-soluble film under water pressure characterized by having a high glossy pattern portion and a low glossy pattern portion imparted to the outermost decorative layer based on glossy variation corresponding to a combination of ultraviolet ray hardening resin composite applied on the print pattern to be wholly united with the print pattern and hardened by an ultraviolet ray and a component of the print pattern.

In the first dependent feature, the low glossy pattern portion may be formed on a portion of the print pattern where an ink including a high oil absorption component to absorb the ultraviolet ray hardening resin composite is transferred. One of the high oil absorption components may be a coloring agent in the ink of the print pattern and more particularly carbon black in the black ink of the print patter may serve as the high oil absorption component.

In the fundamental feature of the invention, the low glossy pattern portion has a glossy degree of less than 20 when it is measured according to “mirror surface gloss of method 30-60 degree” in Japanese Industrial Standards Z8741-1997 and a difference of glossy degree between the high glossy pattern portion and the low glossy pattern portion is equal to 10 or more when it is measured according to “mirror surface gloss of method 30-60 degree” in Japanese Industrial Standards Z8741-1997.

In the first dependent feature of the invention, the high glossy pattern portion may be formed in a portion where the ink containing a low oil absorption component which has a low absorption function to absorb the ultraviolet ray hardening resin composite or in a portion where the ink of low ink density is transferred, but may be formed at a non-print portion where the ink density is of zero or there is no ink.

In the first dependent feature of the invention, the ultraviolet ray hardening resin composite contains a matting component, which imparts a matting effect to the high and low glossy pattern portions. In the first dependent feature of the invention, the outermost decorative layer having the high and low glossy pattern portions may desirably have solvent resistance adapted to be never deteriorated even by manually and reciprocatively wiping a ten-sheet piled gauze containing xylene on the decorative layer eight times while it is rubbed thereon.

In the feature of the invention, the print pattern has a grain pattern, the high glossy pattern portion of the outermost decorative layer corresponds to a rough organization expression portion of the grain pattern while the low glossy pattern portion of the outermost decorative layer corresponds to a fine organization expression portion of the grain pattern and the rough organization expression portion corresponds to an early wood portion while the fine organization expression portion corresponds to a late wood portion whereby the outermost decorative layer has a design of cross or straight grain.

Another feature of the invention is to provide a water pressure transfer article characterized by having a decorative layer formed according to either of the aforementioned features of the invention.

The first dependent feature of the invention may be suitably applied also to the water pressure transfer article comprising a base body having a color tone corresponding to that of grain where a ground color is to be transferred and having the decorative layer formed thereon.

Furthermore, the first dependent feature of the invention may be applied also to the water pressure transfer article having the print pattern of single color (monochrome) in which the high glossy pattern portion corresponds to a non-print portion of the single color of the print pattern while the low glossy pattern portion corresponds to the single color print portion.

In case of the water pressure transfer article having the single color pattern, the single color pattern may be formed by printing with the ink of color substantially identical to the ground color of the water pressure transfer article whereby the outermost decorative layer may have the design of monotone through both of the high and low glossy pattern portions.

Similarly, in case of the water pressure transfer article having the single color pattern, the single color pattern may be formed by printing with the colorless ink whereby the outermost decorative layer may have the design of monotone formed by the ground color penetrating the single color pattern through both of the high and low glossy pattern portions.

The first dependent feature of the invention may be suitably applied also to the water pressure transfer article having a transparent base body and having the outermost decorative layer including the high and low glossy pattern portions formed on the transparent base body.

A second dependent feature of the invention is to provide a water pressure transfer article having an outermost decorative layer formed thereon by transferring a print pattern on a water-soluble film under water pressure characterized in that the outermost decorative layer has the outermost surface of unevenness formed corresponding to a combination of ultraviolet ray hardening resin composite applied on the print pattern to be wholly united with the print pattern and hardened by an ultraviolet ray and a component of the print pattern and an amount of application of the ultraviolet ray hardening resin composite. The ultraviolet ray hardening resin composite applied on the print pattern serves to recover the adhesion of the print pattern on a water pressure transfer operation, but is used only for a purpose of imparting solvent resistance etc., in case that the print pattern itself has the adhesion.

In the second dependent feature of the invention, the unevenness of the decorative layer may be formed in a print pattern portion where there is transferred the ink containing a high oil absorption component, and especially formed prominently in a portion where a lot of ink containing this high oil absorption component is transferred. One of the high oil absorption components may be a coloring agent in the ink of the print pattern and more particularly carbon black in the black ink of the print patter may serve as the high oil absorption component.

In the second dependent feature of the invention, the outermost decorative layer having the unevenness may desirably have solvent resistance adapted to be never deteriorated even by manually and reciprocatively wiping a ten-sheet piled gauze containing xylene on the decorative layer eight times while it is rubbed thereon.

The second dependent feature may be suitably applied especially to a steering wheel for a car.

In the invention, what is meant by the term "unevenness" may be fine unevenness and in addition thereto an area of combination of an area portion (a convex area) having the fine unevenness and an area portion (a concave area) having a level lower than the concavity or recess of the fine unevenness or a flat surface.

In this manner, the decorative layer is formed by hardening by the non-solvent type ultraviolet ray hardening resin composite layered or coated on the transfer film on the water pressure transfer operation while the resin composite is wholly united with the print pattern. In this manner, the decorative layer is able to provide mechanical and chemical surface protection functions such as wear resistance, solvent resistance, medicine resistance, weather resistance and so on. Thus, no dust adheres to the print pattern, which occurs in the prior art in which a surface protection layer (topcoat layer) is formed on the decorative layer to improve an excellent article rate. Furthermore, the decorative layer can have the design expression maintained while the decorative layer is exposed and never reduced by the surface protection layer (topcoat layer) applied to the decorative layer in the prior art whereby the product (water pressure transfer article) having the design expression maintained can be provided.

The decorative layer is formed by being hardened in the state where the ultraviolet ray hardening resin composite is wholly united with the print pattern, with the absorption of this ultraviolet ray hardening resin composite varying in accordance with the kind of the pigments in the ink of the print pattern. For instance, since the carbon black that is the color pigment in the black ink easily absorbs the ultraviolet ray hardening resin composite, there is formed the low glossy pattern portion where the reduction of the glossy feeling is observed by forming the fine unevenness on the decorative layer in the position (the decorative layer portion=the ink printed portion) in which the ink having this pigment added at a high density is transferred and there is also formed the convex area by hardening the decorative layer in the state where the ultraviolet ray hardening resin composite is absorbed in the ink. On the other hand, there is formed the high glossy pattern portion where the high glossy feeling is observed by forming little fine unevenness on the decorative layer in the position in which the ink other than the black ink or the ink of low density is transferred (also the decorative layer portion=the ink printed portion) and there is also formed the concave area having the level relatively lower than that of the convex area by hardening the decorative layer in the state where there is little absorption of the ultraviolet ray hardening resin composite in the ink. Thus, since the difference of the glossy feelings adjacent to each other necessarily occurs on the decorative layer corresponding to the print pattern, there can be provided the products (the water pressure transfer article) having the cubic effect imparted to the decorative layer under the presence of the difference of the glossy feelings.

Although the difference of the glossy degree between the high and low glossy pattern portions is desirably 10 or more, in some cases, the difference might be felt large even if it is smaller than 10. That is, the numerical value measured by the glossy degree meter cannot agree with the visual feeling at the ratio of 100%, its visual feeling is generally blunt within the range of the values of 30 to 60 and gets sharp as the glossy degree is out of the range. For instance, even though the difference value of the measured numerical values of the glossy degree is only 5, there seems no change in the glossy feeling relative to 5 of the difference value of the glossy degrees if it falls within the range of 30 to 60, but 5 of the difference value of the glossy degrees will be felt remarkably large if the glossy degrees are out of the range upwardly or downwardly. Of course, the larger the difference value of the glossy degree is, the larger it is felt, but if the glossy degree of the low glossy pattern portion is less than 20, for example, there is felt no gloss with a glance and therefore in case that the difference value of the glossy degree between the high and low glossy pattern portions is 10, the difference will be felt remarkably large. Nevertheless, the invention does not exclude the range of the difference value of the glossy degree of 30 to 60.

If the depicted print pattern direction is cross grain or straight grain, for instance, since the ink of brown or light-brown color is transferred at a low concentration in the position where the early wood portion is expressed, the degree of absorption of the ultraviolet ray hardening resin composite is reduced in this position to provide the high glossy pattern portion, but since the black ink, etc., are transferred at a high concentration in the position where the late wood portion is expressed, the degree of absorption of the ultraviolet ray hardening resin composite increases in this position to provide the low glossy pattern portion. As the differences of the glossy degree exist adjacent to each other, the three dimensional or cubic effect like that of real wood can be felt. In addition thereto, there appears the low glossy pattern portion in the position where the black dots exist and since the low glossy pattern portion is observed as if it is a deepened hole at the cut end when the duct is cut nearly at a right-angle, there can be provided the products (the water pressure transfer article) having the real wood feeling and the qualitative feeling of cross grain and straight grain wholly imparted thereto. It should be noted that there can be also easily provided the products that are felt to be the qualitative feeling of wood called a high grade tree having a portion of knot or root of branch or a portion including gum cut, other than general grain such as cross grain or straight grain.

With the ultraviolet ray hardening resin composite containing a matting component hardened in the state where it is wholly united with the print pattern, since the matting component effectively acts by the high glossy pattern portion, the whole tone of the decorative layer is lowered toward the reduction of the difference of the glossy degree between the high and low glossy pattern portions and therefore there can be provided the products (the water pressure transfer articles) which have such tastes as the quiet taste and the elegant simplicity applied thereto.

BRIEF DESCRIPTION OF THE DRAWINGS

FIG. 2A is a cross sectional view of a transfer film, FIG. 2B is a cross sectional view of the transfer film in the state where an ultraviolet ray hardening type coating material as one example of an ultraviolet ray hardening resin composite is applied on the transfer film, FIG. 2C is a cross sectional view of the transfer film in the state where it is floated on a surface of water, FIG. 2D is a cross sectional view of the transfer film in the state immediately before an article for a print pattern to be transferred thereon is forced underwater, FIG. 2E is a cross sectional of the state where an ultraviolet ray is irradiated on the article after water pressure transfer, FIG. 2F is a cross sectional view of the state where a water soluble film is water-washed and FIG. 2G is a cross sectional view of the state where the surface of the article is being dried.

BEST MODE OF EMBODIMENT OF INVENTION

Figure 1:
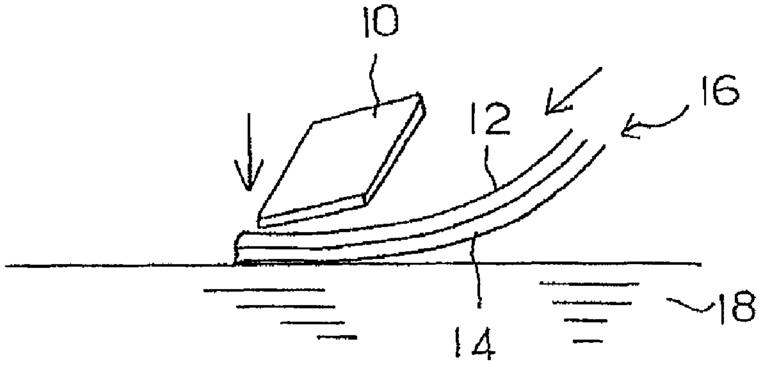
FIG. 1 is an outline view in which a water pressure transfer method used in the invention is briefly illustrated.

Describing forms of embodiment of the invention with reference to the drawings, FIG. 1 briefly illustrates a water pressure transfer method, to which the invention is applied. This water pressure transfer method is the one in which a transfer film 16 comprising a water soluble film 14 having a print pattern 12 applied thereon is floated on water 18 within a transfer bath (not shown) with the print pattern on the upper side. An article 10, to which the print pattern is to be transferred under water pressure, is forced underwater through the transfer film 16 whereby the water pressure transfer is accomplished.

The water soluble film 14 is formed of water soluble material having a main ingredient of polyvinyl alcohol, for example, which gets wet and is softened by absorbing water. This water soluble film 14 is softened when it contacts the water within the transfer tub and is wound around the article 10 to be decorated whereby the water pressure transfer can be accomplished. The print pattern 12 may be previously applied on the water soluble film 14 by gravure printing and so on in case of general water pressure transfer.

The feature of this water pressure transfer method is to apply or coat an ultraviolet ray hardening resin composite, ideally a non-solvent type ultraviolet ray hardening resin composite to the print pattern 12 of the transfer film 16 before transferring the print pattern on the article under water pressure.

An example of the concrete steps of the water pressure transfer method performing to recover the adhesion of the dried print pattern 12 of the transfer film 16 will be described. The operation begins from the state where the print pattern 12 printed on the water soluble film 14 is in a dried condition (see FIG. 2A). Although not shown, in practice, the transfer film 16 is in the form of roll obtained by previously printing the print pattern 12 on the elongated water soluble film 14 and drying the print pattern 12. The transfer film 16 may be used while being continuously fed from the film roll or by cutting it thereafter.

When the water pressure transfer operation should be carried out, a non-solvent type ultraviolet ray hardening type coating material 20 including photo-polymerization monomer is applied on the dried print pattern 12 of the transfer film 16 of FIG. 2A (see FIG. 2B), the transfer film 16 is floated on a water 18 within a transfer tub in the state where the print pattern 12 is activated by the non-solvent type ultraviolet ray hardening type coating material 20 to thereby recover the adhesion of the print pattern 12 (see FIG. 2C), thereafter an article 10 together with the transfer film 16 is forced underwater so as to force the print pattern 12 containing the ultraviolet ray hardening type coating material 20 against the surface 10S of the article (see FIG. 2D) and an ultraviolet ray 22 is irradiated on the article 10 on which the print pattern 12 containing the ultraviolet ray hardening resin composite 20 is transferred whereby the ultraviolet ray hardening resin composite 20 and the print pattern 12 are hardened (see FIG. 2E). Although not shown in the drawings, the article 10 may be forced underwater while it is conveyed by a reverse triangle-like conveyer or supported by a robot arm. In some cases, the step of applying the ultraviolet ray hardening resin composite 20 on the print pattern 12 (see FIG. 2B) and the step of floating the transfer film 16 on the water (see FIG. 2C) may be reversely carried out whereby the non-solvent type ultraviolet ray hardening resin composite 20 may be applied by spray on the print pattern of the transfer film 16 which is floated on the water so as to recover the adhesion of the print pattern 12.

The ultraviolet ray hardening resin composite 20 is a resin composite, which can be hardened for a relatively shorter time by the chemical action of the ultraviolet ray and may be in the form of ultraviolet ray hardening type coating material, ultraviolet ray hardening type ink, ultraviolet ray hardening type adhesives, etc., according to its use, but they include (1) photo-polymerization pre-polymer, (2) photo-polymerization monomer and (3) photo-polymerization initiator as indispensable ingredients. What is commercially on the market as an ultraviolet ray hardening type coating material generally has solvents such as thinner added thereto and although some ultraviolet ray hardening ink has solvents such as alcohol added thereto, general ultraviolet ray hardening type ink has no solvents added thereto and is blended with a photo-polymerization monomer to serve as a dilution agent. In the invention, the "ultraviolet ray hardening resin composite", which is necessary for the water pressure transfer method is essentially blended with the photo-polymerization pre-polymer, the photo-polymerization monomer and the photo-polymerization initiator in spite of the form of use of ultraviolet ray hardening resin and also has the property to be hardened by ultraviolet ray irradiation without any solvent.

What is meant by the "ultraviolet ray hardening resin composite" to be used with the illustrated water pressure transfer method excludes the ultraviolet ray hardening resin composite having a solvent contained therein and is limited to the non-solvent ultraviolet ray hardening resin composite having no solvent add. This is because what recovers the adhesion of the print pattern of the transfer film is the non-solvent activation component in the non-solvent type ultraviolet ray hardening resin composite, which is typically a photo-polymerization monomer for intending to obtain various advantages based on the non-solvent type. The ultraviolet ray hardening resin composite applicable as the non-solvent type ultraviolet ray hardening resin composite comprises the ingredient having the following composition;

(1) Oligomer (photo-polymerization pre-polymer) 30-50 weight %
(2) multi-functional acrylate (photo-polymerization monomer) 10-30 weight %
(3) single functional acrylate
(photo-polymerization monomer) 10-40 weight %
(4) photo-polymerization initiator 0.5-5 weight %
(5) non-reactive additives 1-20 weight %

The photo-polymerization pre-polymer is the polymer which can be further hardened by photochemical action and is called "photo-polymerization unsaturated polymer", "base resin" or "photo-polymerization oligomer". This pre-polymer is a basic ingredient which affects many fundamental physical properties as a coat film after being hardened and an acrylic oligomer, a polyester oligomer, an epoxy acrylate oligomer and an urethane acrylate oligomer may be used independently or arbitrarily combined. Although the degree of polymerization of photo-polymerization pre-polymer is not so high as final polymer, it is not a monomer and polymerized to some extent and therefore it has the suitable viscosity and therefore a dilution agent is required in consideration of the effectiveness of operation on its use.

The photo-polymerization monomer serves as a dilution agent for photo-polymerization pre-polymer while maintaining the practical effectiveness of operation of the resin composite and itself participates in polymerization. There are a single functional monomer having a single functional group and a multi-functional monomer having two or more functional groups. The single functional monomer serves to improve adhesion to the article and to impart softness to the coat film after being hardened and the multi-functional monomer serves as a bridge formation agent which bridges prepolymer molecules. For instance, the poly acrylate such as a poly-acrylic acid methyl is used for easing a contraction action of the coat membrane caused by bridge formation. If the contraction power of the coat membrane becomes high, the adhesion of the coat membrane is reduced, but the polyacrylate can usefully prevent this. These photo-polymerization monomers serve as a dilution agent for adjusting the viscosity of the ultraviolet ray hardening resin composite and also serve as a functional ingredient (activation ingredient) for recovering the adhesion of the dried print pattern.

The photo-polymerization initiator serves to absorb the ultraviolet ray to start a polymerization reaction and is also called "photo-polymerization initiator". Acetophenone, benzophenone, etc. may be used when the ultraviolet ray hardening reaction is a radical reaction, while diazo compound, etc. may be used when the ultraviolet ray hardening reaction is an ion reaction.

The ultraviolet ray hardening resin composite may have a sensitizer, a filler, an inactive organic polymer, a leveling agent, a thixotropy imparting agent, a thermo-polymerization prohibition agent and a deglossing component, etc., added thereto. As described later in details, the deglossing component may be used for enhancing the design expression of the water pressure transfer article obtained by the invention.

Although the step of applying the non-solvent type ultraviolet ray hardening type coating material 20 may be carried out by means of either of photogravure roll, wire bar coating and spray, since the spray applying process consumes a lot of coating materials, the photogravure roll application process or the wire bar application process may be preferable for applying the coating material.

As the non-solvent type ultraviolet ray hardening resin composite 20A is applied on the print pattern 12, the photo-polymerization monomer in the non-solvent type ultraviolet ray hardening resin composite 20A permeates into the dried ink of the print pattern 12 to dissolve the ink whereby the adhesion of the ink which is in the same wet state as immediately after printing the print pattern can be restored. Therefore, the non-solvent type ultraviolet ray hardening resin composite 20 can have the function equivalent to the conventionally used activation agent to thereby omit the application of the activation agent, the thinner, etc. and since each ingredient in the ultraviolet ray hardening resin composite including the photo-polymerization monomer generally has the volatility far lower than the solvent etc., the degree of the recovered adhesion neither varies nor is lowered after its recovery, which enables the expectation of the stabilization of the activation.

As the print pattern 12 is transferred on the article 10 and the ultraviolet ray 22 is irradiated thereon, the ultraviolet ray hardening resin composite is hardened in the state where each ingredient of the ultraviolet ray hardening resin composite 20A such as the photo-polymerization monomer permeates into the ink of the print pattern 12 whereby both of the ultraviolet ray hardening resin composite and the ink are wholly united. This imparts mechanical surface protection function such as wear resistance, etc. and chemical surface protection function such as solvent resistance, medicine resistance, etc. to the decorative layer itself. Although FIG. 2B doesn't illustrate the state where the ink ingredient of the print pattern 12 and the ultraviolet ray hardening resin component are wholly united, if these figures try to show such state, then it becomes impossible for both to be distinguished from each other and it should understand that they are conveniently indicated in the state of layers.

It will be explained in detail that with the non-solvent type ultraviolet ray hardening resin composite used for the water pressure transfer method, various advantages can be obtained. It might be understood that even by using the solvent containing ultraviolet ray hardening resin composite such as the commercially available ultraviolet ray hardening coating material, the print pattern can be activated without any inconvenience, but even with convenience. However, since the ultraviolet ray hardening resin is hardened by the ultraviolet ray irradiation for a short time, if the added solvent is the low boiling one having the high volatility, the solvent will fully volatize before the article is forced underwater to thereby provide the poor transfer due to shortage of the adhesion while if the added solvent is the high boiling one difficult to volatize, the shortage of the adhesion when the article is forced underwater can be avoided, but the ultraviolet ray irradiation cannot be performed until the solvent volatilizes completely, and if the ultraviolet ray hardening type resin ingredient is hardened by the ultraviolet ray irradiation in the state of inadequate volatilization of the solvent, which is in the state where the solvent is involved, defects will be produced later. Thus, if there is used the ultraviolet ray hardening resin composite having the solvent added thereto, which is either of low boiling point or of high boiling point, there is a possibility of producing the health injury due to air pollution or human body breathing and also of producing various problems in process or quality.

On the other hand, as already described partially, if the non-solvent type ultraviolet ray hardening resin composite is used, since the photo-polymerization monomer can also serve as a dilution agent for the purpose of the adjustment of viscosity, more quantity of non-solvent ultraviolet ray hardening resin composite can be prepared in comparison with the solvent containing type one. This enables the recovery of the adequate and stable adhesion only by the action of the non-solvent activation ingredient in the non-solvent type ultraviolet ray hardening resin composite, which is typically the photo-polymerization monomer. Furthermore, since the ultraviolet ray hardening resin composite 20 and the print pattern 12 are wholly united with each other and hardened and the photo-polymerization monomer itself which has a function equivalent to the conventionally used solvent participates in polymerization, this photo-polymerization monomer is never subsequently separated to cure other problems.

The ultraviolet ray 22 is preferably irradiated while the water-soluble film 14 of the transfer film 16 is wound around the article 10 on which the print pattern 12 containing the ultraviolet ray hardening type coating material 20 is transferred and thus it is preferably carried out after the article 10 is still underwater or before the water-soluble film 14 is water-washed and removed even though it comes out of the water. The ultraviolet ray 22 is irradiated by a conventional ultraviolet ray hardening equipment including light source lamps such as high-pressure mercury lamps or metal halide lamps and an irradiation machine (lamp house).

In this manner, as the ultraviolet ray 22 is irradiated while the water-soluble film 14 is wound around the article, any dirt etc. cannot be adhered to the article so as to be kept being secured thereto before the print pattern 12 gets completely dry, the possibility of dirt adhesion can be reduced because the print pattern 12 is hardened when the water-soluble film 14 is removed whereby the decorative layer 30 of good appearance can be obtained easily. The irradiation of the ultraviolet ray 22 may be carried out after the water-soluble film 14 is water-washed out of the article 10 in case where the irradiation of the ultraviolet ray 22 is carried out under an environment having no dust or dirt such as a tunnel like a clean room.

Then, as shown in FIG. 2F, the water shower 24 is injected to wash the article 10 by water to thereby remove the water-soluble film 14 of the transfer film 16 which the article is covered with. Subsequently, as shown in FIG. 2G, a hot wind or air 26 is blown to the article 10 to which the print pattern 12 containing the ultraviolet ray hardening resin composite 20 is transferred to thereby dry the surface of article 10 whereby the product 10' having the decorative layer 30 is completed (see FIG. 3).

Since the decorative layer 30 of the thus obtained water pressure transfer article is formed in the state where the ultraviolet ray hardening resin composite coated on the transfer film for recovering the adhesion of the print pattern on the water pressure transfer operation penetrates and is wholly united with the print pattern and hardened by the ultraviolet ray, the decorative layer 30 has the mechanical and chemical surface protection functions such as wear resistance, solvent resistance, medicine resistance, weather resistance and so on. Thus, there can be provided the product (water pressure transfer article) having the outermost appearance of the decorative layer itself formed by the water pressure transfer without any surface protection layer (topcoat layer), which is necessary in the prior art. As the surface protection layer (topcoat layer) is not required to be formed in this manner, there is little possibility of adhering dust, which tends to occur when the topcoat layer is formed and therefore there can be provided the product having a high rate of excellent goods having little dust adhered thereto.

It is one of the most important features of the invention that the thus obtained decorative layer can avoid the reduction of the design expression, which has occurred due to the surface protection layer used in the prior art. In addition thereto, the thus obtained decorative layer can obtain the design expression, which could not be accomplished in the prior art and which will be explained in details later.

Figure 2:
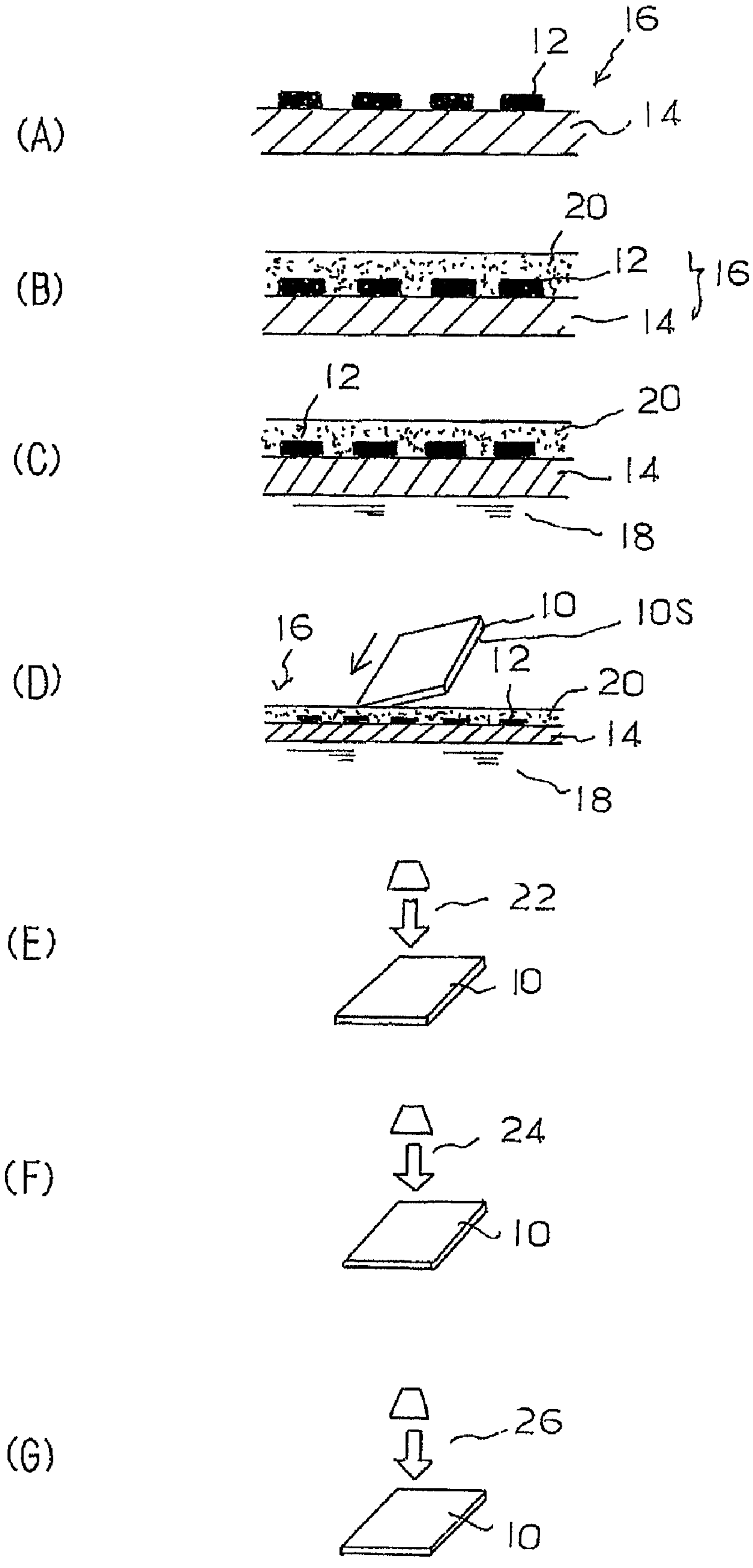
FIG. 2 illustrates the water pressure transfer method according to a first form of the invention in order of steps.
Figure 3:
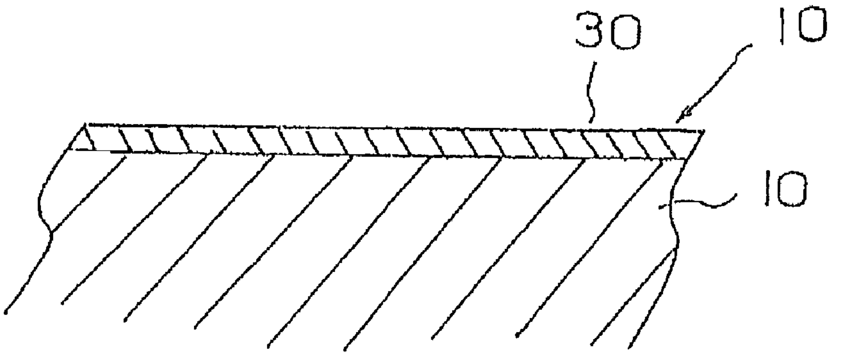
FIG. 3 is an enlarged cross sectional view of a product obtained by the method of the invention.
Figure 4:
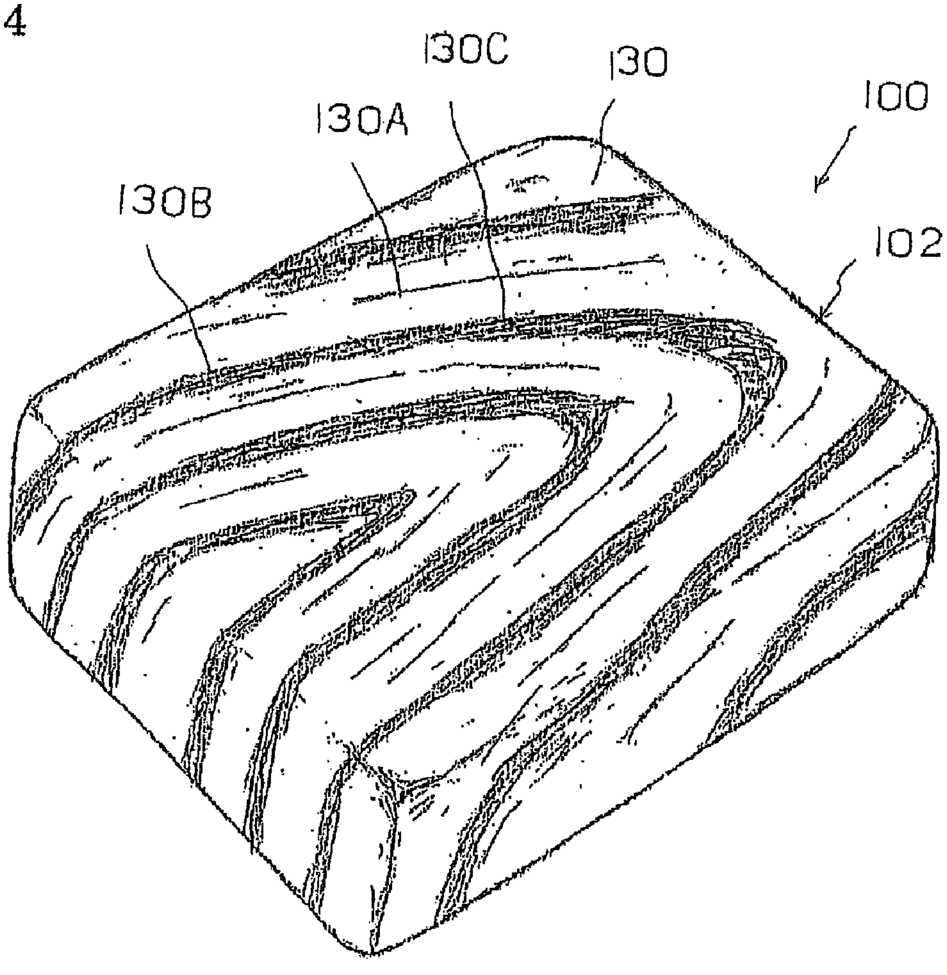
FIG. 4 is a perspective view of the product according to one embodiment form of the invention.

One form of embodiment of the invention, which is as an example a product having the print pattern of grain transferred under water pressure will be described in detail with reference to FIG. 4. The product (water pressure transfer article) 100 comprises a base body (body to be transferred under water pressure) 102 formed of ABS resin in the form of a lid of an accessory case. A decorative layer 130 is formed by transferring a print patter of grain on a raising portion of the lid and on an upper surface succeeding from the raising portion by the water pressure transfer method as shown in FIG. 2. Since the ABS resin itself, which is the material of the base body, has a color of light brown previously applied in a uniform manner, the decorative layer 130 has the grain pattern of ink color of the print pattern superposed on the background of light brown.

Figure 5:
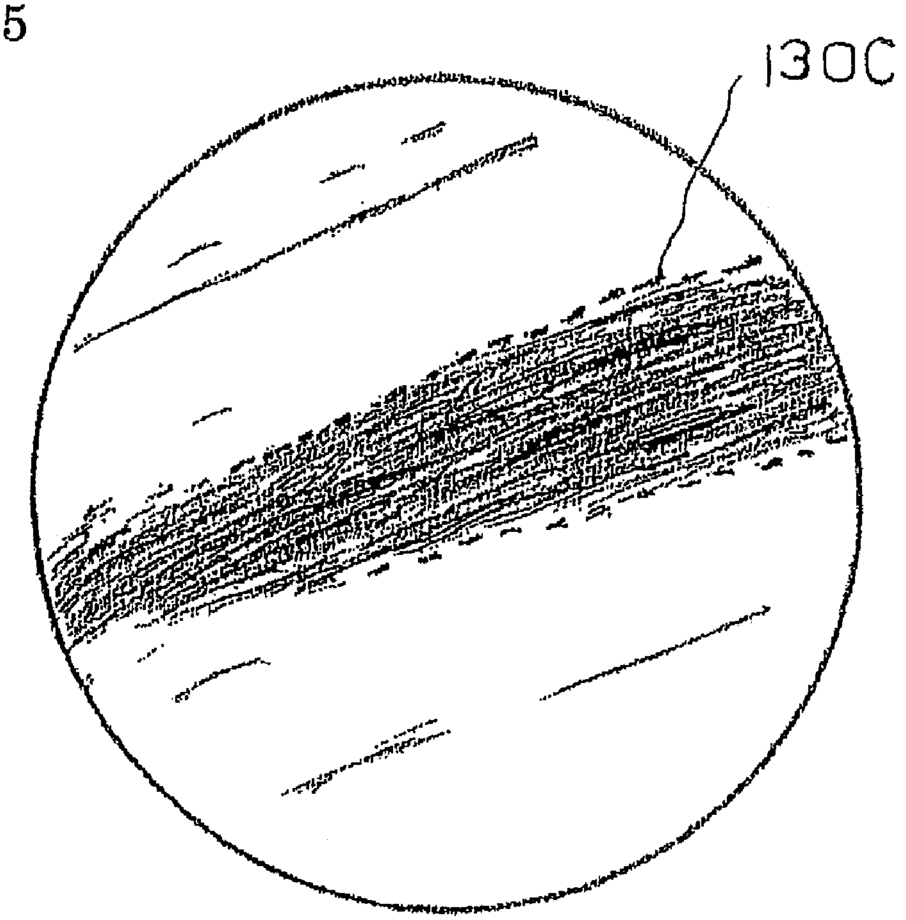
FIG. 5 is an enlarged view showing a portion of pattern of the product of FIG. 4.

Pattern portions 130A of the decorative layer 130 are ones where there is expressed an early wood portion of the grain pattern, which is a relatively rough organization formed in spring, are formed by transferring light brown ink of low ink concentration on the ground color of light brown and provide an appearance having brown stripes running in some places on the light brown background. Pattern portions 130B of the decorative layer 130 are ones where there is expressed a late wood portion of the grain pattern, which is a relatively density organization formed in summer or in autumn, are formed by transferring black or dark brown ink of high ink concentration on the ground color of light brown and therefore provide an appearance of dark brown or nearly black color so that the ground color of light brown is almost concealed. Pattern portions 130C of the decorative layer 130 are ones which lie in a boundary between the pattern portions 130A expressing the early wood portion and the pattern portions 130B expressing the late wood portion and have black dots applied. The pattern portions 130C are ones which are observed as if they are a cut end formed when the conduit is cut at nearly right angle as shown in FIG. 5 in an enlarged manner.

In this decorative layer 130, as the pattern portions 130B expressing the late wood portion are compared with the pattern portions 130A expressing the early wood portion, the late wood portion 130B is seemingly felt that the glossy degree is reduced while the early wood portion 130A is seemingly not so much felt that the glossy is so reduced and therefore the difference of the glossy degree is recognized between these portions.

It has been found by various confirmation tests that the ultraviolet ray hardening resin composite coated on the transfer film for recovering the adhesion of the print pattern on the water pressure transfer operation is easy or hard to be absorbed on the kinds of the pigment in the ink of the print pattern. For instance, since the high oil absorption component such as the carbon black in the black ink easily absorbs the oil of the ultraviolet ray hardening resin composite, there is formed the low glossy pattern portion where the reduction of the glossy feeling is seemingly observed because the ultraviolet ray hardening resin composite is hardened in the state where the particle feeling (fine unevenness) of the pigments is exposed in the position of the decorative layer portion where the ink having a lot of pigments added is transferred. On the other hand, there is formed the high glossy pattern portion having the glossy feeling maintained in the ink printed position where the ink containing the low oil absorption component such as the pigments hard to absorb the ultraviolet ray hardening resin composite or the ink of low density is transferred because the ultraviolet ray hardening resin composite is not so much absorbed by the pigments, but placed between the particles of the pigments and hardened by the ultraviolet ray.

In this manner, the water pressure transfer article obtained by the invention has the low glossy pattern portions for the late wood portions and the high glossy pattern portions for the early wood portions and has the three dimensional or cubic effect imparted by the gloss variation based on the difference of the glossy degree exiting adjacent to each other between these portions. Also, the article of the invention gets the low glossy pattern portion in the position where the black dots are located and the cut end of the conduit cut nearly at right angle is seemingly observed to be a hole having a depth. Thus, the whole decorative layer 130 has the real wood feeling and the qualitative feeling of cross or straight grain imparted thereto. Of course, there can be provided the products (water pressure transfer articles) having the decorative layer in which there is impressed the qualitative feeling of high grade trees such as trees having grain pattern of ball, foam, grape-vine, bird-eye or scale having an appearance portion of knot or root of branch or a portion including gum cut or an appearance portion of particular kind of trees in addition to cross grain or straight grain.

With the ultraviolet ray hardening resin composite containing the matting component hardened in the state where it penetrates and is wholly united with the print pattern, since the matting (deglossing) component more effectively acts to the high glossy pattern portion, the difference of the glossy degree between the high and low glossy pattern portions is reduced and therefore the whole tone can be dropped. Thus, there can be provided the water pressure transfer article having the taste of the simplicity and the quiet taste given.

The ultraviolet ray hardening resin composite is easy or hard to be absorbed on the kinds of the pigment in the ink of the print pattern, but the high oil absorption component to easily absorb the ultraviolet ray hardening resin may be carbon black or pine soot of the black pigment as considered from the numerical value described as a general absorption amount in the technical documents even though it has not been practically confirmed by the ultraviolet ray hardening resin composite. The index of the oil absorption amount of the carbon black is 100 to 258 while that of the pine soot is 60 to 158. These oil absorption amounts are extraordinarily high and it is considered that they remarkably absorb the ultraviolet ray hardening resin composite. The other pigments considered as the high oil absorption component, which easily absorb the ultraviolet ray hardening resin composite, may be an extender pigment such as a precipitated barium sulfate, a diatomaceous earth of an extender pigment having the oil absorption amount of 47, a rouge of a red system pigment having the oil absorption amount of 54, an iron blue of a blue pigment having the oil absorption amount of 74 and an ocher of a yellow pigment having the oil absorption amount of 72. The coloring pigments used for various color inks should be desirably selected in consideration of means to protect the color from fading such as light resistance in addition to the value of the oil absorption amount.

Even in the prior decorative layer obtained by the water pressure transfer in which the adhesion of the print pattern is recovered by the activator of the prior art, there might appear some difference of the glossy degree due to the difference of absorption based on the kinds of the pigment of the ink or the ink density thereof because some activator or ink component is absorbed by the pigment in the decorative layer. However, as already described, since there cannot be provided the product having the decorative layer as the outermost surface layer due to the shortage of the surface protection functions of the decorative layer obtained by using the activator of the prior art, the design expression is reduced by the surface protection layer, which should be applied on the decorative layer. However, the effect is advantageously more remarkable in the decorative layer obtained by transferring the print pattern, the adhesion of which is recovered by the ultraviolet ray hardening resin composite because the decorative layer obtained by using the ultraviolet ray hardening resin composite can more easily absorb the resin component than the decorative layer of the prior art.

In this manner, the water pressure transfer article of the invention can obtain various advantages by using the non-solvent type ultraviolet ray hardening resin composite. The term "non-solvent type" in the non-solvent type ultraviolet ray hardening resin composite used by this water pressure transfer method does not mean that there is absolutely zero of a "solvent ingredient" but is neither exclusive of one having solvent ingredient added for other reasons nor exclusive of one having solvent ingredient used for producing the monomer or the pre-polymer, but remained if there can be obtained the function of re-adhesion of the print pattern by the non-solvent activation ingredient in the ultraviolet ray hardening resin composite, which is typically photo-polymerization monomer to the necessary and full degree. Similarly, the term "non-solvent type" does not mean that there is absolutely zero of "volatility" of the optical polymerization monomer, but means that it is not as high as the solvent and therefore it may have the volatility in such a degree as can be disregarded practically.

Figure 6:
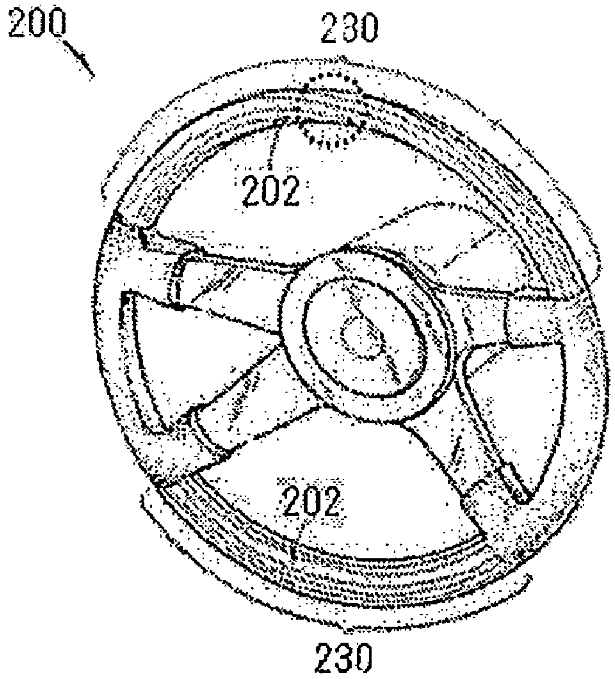
FIG. 6 is a perspective view of the product according to another embodiment form of the invention.

In another embodiment of the invention, an example of which is a product having a print pattern of grain transferred under water pressure, will be described in details with reference to FIG. 6. This product (water pressure transfer article) 200 comprises a base body (a pattern-transferred body) 202 formed of ABS resin in the form of a steering wheel for a car. A decorative layer 230 is formed by transferring the print pattern of grain by the water pressure transfer method shown in FIG. 2. Since the ABS resin itself, which is the material of the base body 202, has a color of light brown applied thereto in a uniform manner, the decorative layer 230 has the grain pattern of the color of the ink in the print pattern superposed on the ground color of light brown.

Pattern portions 230A of the decorative layer 230 are ones where there is expressed a relatively rough organization in the grain pattern, are formed by transferring light brown ink of low ink concentration on the ground color of light brown and provide an appearance having brown stripes running in some places on the light brown background. Pattern portions 230B of the decorative layer 230 are ones where there is expressed a relatively density organization in the grain pattern, are formed by transferring black or dark brown ink of high ink concentration on the ground color of light brown and therefore provide an appearance of dark brown or nearly black color so that the ground color of light brown is almost concealed.

Figure 7:
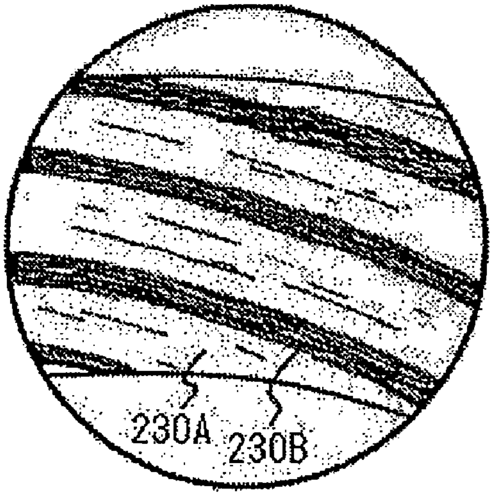
FIG. 7 is an enlarged view showing a portion of pattern of the product of FIG. 6.

In this decorative layer 230, the pattern portion 230B has a fine unevenness 230R as shown in FIG. 7. This is obtained by the ultraviolet ray hardening resin composite coated or applied on the transfer film being absorbed in accordance with the component of the pigment in the ink of the print pattern and the application or coating amount thereof and for example the ultraviolet ray hardening resin composite being oil-absorbed by the high oil absorption component such as the carbon black in the black ink, etc., so as to be hardened in the state where the particle feeling (fine unevenness) appears in the position in which the ink having a lot of pigments added thereto is transferred. This is obtained also by the expansion and contraction of the surface of the decorative layer when it is dried. At the same time, the pattern portion 230B has a thick convex area formed by being hardened in the state where the ultraviolet ray hardening resin composite is more absorbed. On the other hand, the pattern portion 230A has a relatively thinner concave area formed by little generation of unevenness and also by the ultraviolet ray hardening resin being hardened in the state where it is seldom absorbed.

The outermost decorative layer 230 having the unevenness (fine unevenness and/or unevenness area) desirably has solvent resistance adapted to be never deteriorated even by manually and reciprocatively wiping a ten-sheet piled gauze containing xylene on the decorative layer eight times while it is rubbed thereon.

EMBODIMENTS

There will be explained Embodiments 1 through 4 according to the form of embodiment of the invention and Comparisons 1 through 7, which impart the glossy difference to the decorative layer of the article.

Embodiment 1

In the concrete embodiment 1 of the invention, the non-solvent type ultraviolet ray hardening resin composite called the trade name "UVIC S CLEAR-33-N2" manufactured and commercially marketed by Ohashi Kagaku Kogyo Co., Ltd., Japan was used for recovering the adhesion of the ink of the transfer film. The adhesion of the ink of the transfer film having the grain pattern was recovered by this ultraviolet ray hardening resin composite and the grain pattern on the transfer film was transferred under water pressure by sequentially performing the steps shown in FIGS. 2A through 2G. There was the transfer film formed by printing the grain pattern with the dark ink so as to express the stripe-like late wood portions of black or dark brown and the early wood portions of brown between the adjacent late wood portions and sold by Cubic Co., Ltd. to the licensees as the trade name "ZEBRA LINE". The aforementioned non-solvent type ultraviolet ray hardening resin composite was applied on the print pattern of the transfer film by a wire bar application process immediately before introducing the transfer film into the transfer tub. The transfer film having the non-solvent type ultraviolet ray hardening resin composite applied in this manner was floated on the water in the transfer tub and the article was forced underwater through the transfer film after recovering the adhesion of the print pattern by the ultraviolet ray hardening resin composite as shown in FIG. 2D. After transfer, the article was taken out of the water, an ultraviolet ray was irradiated on the article, and the article was water-washed and dried whereby the water pressure transfer article 10' was obtained.

Embodiment 2

In the concrete Embodiment 2 of the invention, the process was performed in the same manner as that of Embodiment 1, except that there was used the non-solvent type ultraviolet ray hardening resin composite called as "UVIC S MAT CLEAR-33-N2" having the matting specification formed by adding a matting (deglossing) component to "UVIC S CLEAR-33-N2".

Embodiment 3

In the concrete Embodiment 3 of the invention, the process was performed in the same manner as that of Embodiment 1, except that there was used the transfer film sold by Cubic Co., Ltd. to the licensees as the trade name "MESAI DARK" having a camouflage pattern for outdoor goods such as a bow gun, which had four relative large portions of black, dark brown, dark green and of no print arranged in a spotted manner.

Embodiment 4

In the concrete Embodiment 4 of the invention, the process was performed in the same manner as that of Embodiment 3, except that there was used the non-solvent type ultraviolet ray hardening resin composite called as "UVIC S MAT CLEAR-33-N2" having the matting specification.

(Reference 1)

In the concrete Embodiment 5 of the invention, the process was performed in the same manner as that of Embodiment 1, except that there was used the transfer film sold by Cubic Co., Ltd. to the licensees as the trade name "CREATION NATURAL" having a whole grain pattern of light brown, which had no stress of the late and early wood portions wholly on the same basis, in comparison with the transfer film called as the trade name "ZEBRA LINE".

(Comparison 1)

In the Comparison 1, the process was performed in the same manner as that of Embodiment 1, except that there was used the activator of the prior art sold by Cubic Co., Ltd. to the licensees of the water pressure transfer technique as the trade name "CPA-H" (the embodiment product of Japanese Patent No. 3,385,576) without activating the transfer film by the non-solvent type ultraviolet ray hardening resin composite. This had only the decorative layer obtained by the same water pressure transfer method as in the prior art, but was the interim product having the surface protection layer not yet formed.

(Comparison 2)

In the Comparison 2, there was formed on the decorative layer obtained in the Comparison 1 a topcoat layer obtained by spray-coating and drying a transparent coating material called as the trade name "HI-URETHAN No. 2000 CLEAR-G-500 21HP" manufactured by NIPPONYUSI BASF COATINGS Co., Ltd., Japan. This was the water pressure transfer article finished to the state where it could be provided as the final product produced by the same water pressure transfer method as that of the prior art.

(Comparison 3)

In the Comparison 3, there was formed on the decorative layer obtained in the Comparison 1 a topcoat layer obtained by spray-coating and drying a matting type urethane transparent coating material called as the trade name "HI-URETHAN No. 5000 CLEAR-G-4 81HP" manufactured by NIPPON YUSI BASF COATINGS Co., Ltd., Japan.

(Comparison 4)

In the Comparison 4, the process was performed in the same manner as that of Embodiment 4, except that there was used the activator of the prior art sold by Cubic Co., Ltd. to the licensees of the water pressure transfer technique as the trade name "CPA-H" (the embodiment product of Japanese Patent No. 3,385,576) without activating the transfer film by the non-solvent type ultraviolet ray hardening resin composite.

(Comparison 5)

In the Comparison 5, there was formed on the decorative layer obtained in the Comparison 4 a topcoat layer obtained by spray-coating and drying a transparent coating material called as the trade name "HI-URETHAN No. 2000 CLEAR-G-500 21HP" manufactured by NIPPONYUSI BASF COATINGS Co., Ltd., Japan.

(Comparison 6)

In the Comparison 3, there was formed on the decorative layer obtained in the Comparison 4 a topcoat layer obtained by spray-coating and drying a matting type urethane transparent coating material called as the trade name "HI-URETHAN No. 5000 CLEAR-G-4 81HP" manufactured by NIPPON YUSI BASF COATINGS Co., Ltd., Japan.

(Comparison 7)

In the Comparison 7, the process was performed in the same manner as that of Embodiment 5, except that there was used the activator of the prior art sold by Cubic Co., Ltd. to the licensees of the water pressure transfer technique as the trade name "CPA-H" (the embodiment product of Japanese Patent No. 3,385,576) without activating the transfer film by the non-solvent type ultraviolet ray hardening resin composite.

In all the Embodiments, the water pressure transfer could be performed in the substantially identical manner as in the prior art. As the adhesion of the decorative layer of each of the Embodiments was tested by the cross cut tape adhesion test method (1 mm cross 100 measures), it was confirmed that the article of each of the Embodiments 1 through 4 and the Reference 1 had the same adhesion as the articles of the Comparisons 1, 4 and 7 having the print pattern transferred while activated by the conventional activator, but having no topcoat and the article of the Comparisons 2, 3, 5 and 6 having the topcoat layer formed by applying the conventional urethane transparent resin on the decorative layer.

As a ten-sheet piled gauze containing xylene was reciprocatively wiped on the surface of the product eight times while it was rubbed thereon as a solvent resistance test, it was confirmed that the product of either of the Embodiments had the solvent resistance as good as that of the products of the Comparisons 2, 3, 5 and 6 having the conventional urethane transparent topcoat layer. The articles of the Comparisons 1, 4 and 7 having no topcoat layer applied thereon had very poor solvent resistance, which was naturally expected and therefore they could not be commercially available.

As the glossy degree of the product of each of the Embodiments and Comparisons was measured by using the glossy degree meter "Gloss Meter Model GP-60" manufactured by TOKYO DENSHOKU Co., Ltd. according to "mirror surface gloss of method 30-60 degree", a kind of measuring method on "mirror surface glossy degree-measuring method Z8741-1997" of Japanese Industrial Standards, the results were obtained as shown in the Table (1) and the Table (2).

TABLE 1

| | Portion where low glossy pattern portion is positioned | | | Portion where high glossy pattern portion is positioned | |
|---|---|---|---|---|---|
| Dark grain of clear late and early woods | Late wood portion (black - dark brown) | | | Early wood portion (brown) | |
| Embodiment 1 | 20.9 | — | — | 38.6 | — |
| Embodiment 4 | 7.3 | — | — | 12.3 | — |
| Camouflage of three dark colors and ground color | Black portion | Dark brown portion | Dark green portion | | Non-print portion Ground color (gray) |
| Embodiment 3 | 16.2 | 32.8 | 64.2 | — | 88.0 |
| Embodiment 4 | 6.4 | 13.1 | 7.5 | — | 37.8 |
| Light grain of no stress of late and early wood | | | | Light brown | |
| Reference 1 | — | — | — | 62.6 | — |

TABLE 2

| | Portion where low glossy pattern portion is positioned | | | Portion where high glossy pattern portion is positioned | |
|---|---|---|---|---|---|
| Dark grain of clear late and early woods | Late wood portion (black - dark brown) | | | Early wood portion (brown) | |
| Comparison 1 | 26.0 | — | — | 26.0 | — |
| Comparison 2 | 90.2 | — | — | 90.3 | — |
| Comparison 3 | 7.5 | — | — | 7.5 | — |
| Camouflage of three dark colors and ground color | Black portion | Dark brown portion | Dark green portion | | Non-print portion Ground color (gray) |
| Comparison 4 | 48.0 | 42.0 | 42.1 | — | 42.6 |
| Comparison 5 | 89.9 | 90.1 | 90.2 | — | 90.0 |
| Comparison 6 | 7.5 | 7.5 | 7.3 | — | 7.6 |
| Light grain of no stress of late and early wood | | | | Light brown | |
| Comparison 7 | — | — | — | 41.3 | — |

There was a substantial difference of glossy degree between the late and early wood portions in the Embodiment 1 while there was no difference of glossy degree between those portions in the Comparison 1. In the Comparisons 2 and 3, which were finished to the state where they could be commercially sold, there was a large difference between the measured numerical values based on the differences of glossy finish and matting finish between the Comparisons, but there were no glossy degree difference between the late and early wood portions in these Comparisons. In the Embodiment 1, there could appear the strong real feeling of grain pattern because of the difference of glossy degree.

In comparison with the measurement results of the Embodiments 1 and 2, even though the Embodiment 1 had measured numerical values of the late and early wood portions largely reduced, it still had the glossy degree difference between the late and early wood portions, which seemingly imparted to the products the withered feeling such as the quiet and simplicity tastes, which was caused by long exposure to rainstorm and sunlight.

On the other hand, as apparent from the measured numerical values of the Comparisons 2 and 3, with the transparent coating material applied as the topcoat layer irrespective of gloss type or matting type, both of the late and early wood portions were commonly effected so as to have the whole glossy degree increased as the glossy finish or reduced as matting finish, but there could never occur the difference of glossy degree between the late and early wood portions.

As the measurement result of the Comparison 3 is seen, it will be noted that there was apparently generated the difference of glossy degree in the portions of different color and in the portion of the ground color (the position where nothing is printed). The measured numerical values of the glossy degree increased gradually twice between the black and dark brown portions and between the dark brown and the dark green and further increased in the ground color portion so as to have the highest glossy degree. In the Embodiment 3, these differences of glossy degree sensuously provided the depth feeling in order of the black portion, the dark brown portion, the dark green portion and the ground color portion to thereby cubically impart the camouflage pattern.

As the measurement result of the Comparison 4 is seen, it will be noted that there seemed to be generated some difference of glossy degree in the portions of different color and in the portion of the ground color (the position where nothing is printed), but the difference of glossy degree was too small to observe the difference of glossy degree. Since the products could not be commercially sold with the decorative layer being as the outermost surface layer, it will be necessary to form the topcoat layer, but this had the uniform glossy degree on the whole surface as noted from the measurement results of the Comparisons 5 and 6, which could not accomplish the objects of the invention.

The Reference 1 has the low and high glossy pattern portions not formed in a good manner, but it was shown as an example of the measurement of the glossy degree of the high glossy pattern portion. It will be noted that the glossy degree of the Reference 1 has the numerical value of the measurement result of the same brown portion, but it is higher than the glossy degree of the early wood portion of the Embodiment 1 and is substantially identical to the glossy degree of the dark green portion of the Embodiment 3. Thus, it will be guessed from this that the early wood portion of the Embodiment 1 has the brown darker than that of the Reference 1 and therefore the ink having the pigment such as the black pigment added to more easily absorb the ultraviolet ray hardening resin composite in proportion to the darkness comparison is transferred with the higher charge in the Embodiment 1 with the result that the early wood portion has the lower the numerical value. Furthermore, although the dark green portion of the Embodiment 3 is sensuously darker than that of the Reference 1, they have the substantially identical numerical values and it is guessed that this is why there was transferred the ink having the pigment added to originally seldom absorb the ultraviolet ray hardening resin composite.

On the other hand, it will be noted that the numerical value of the glossy degree of the Comparison 7 is substantially identical to those of the black portion, the dark brown portion, the dark green portion and the ground color portion (the transfer portion corresponding to the non-print portion) of the Comparison 4. Synthesizing these measurement results, it will be confirmed that the effect of the glossy degree by the amount of oil absorption of the pigment in the ink component of all the Comparisons seldom depends on the color of the ink (the kind of the pigment) and the charge amount thereof and therefore is less remarkable than that of all the Embodiments.

Accordingly, if the grain pattern having the largest difference of glossy degree between the low and high glossy pattern portions should be obtained, the water pressure transfer should be performed using the transfer film having the print pattern printed by the ink adapted to make the black portion of the Embodiment 3 the late wood portion and to make the light brown of the Embodiment 5 the early wood portion. As noted from the measurement results of the Comparisons, it is confirmed that the products having the prior topcoat layer formed could obtain only the wholly uniform glossy degree and hardly had the remarkable difference of glossy degree even though the decorative layer was obtained by activating the print pattern by the prior activator.

In the Embodiment of the Table 1, since the glossy degree of either of the low and high glossy pattern portions is out of the numerical range of glossy degree of 30 through 60, even the glossy degree difference of 5 was felt to be seemingly large as already described. In the Embodiment 1, the glossy degree of the high glossy pattern portion fell within the range of 30 through 60, but since the glossy degree difference between the low and high glossy pattern portions was as large as about 18, the difference of glossy degree could be fully recognized even though one of them fell within the range.

Although the aforementioned forms of embodiment of the invention had the decorative layer applied on the surface of the three-dimensional article, there can be provided a carbon pattern decorative layer having a further cubic effect by producing a difference of glossy degree between woofs and warps of a carbon pattern obtained by a plain weave of carbon fibers due to the selection of the kind of the black pigment used for the black ink or due to the relative adjustment of ink charging amount even though the woofs and the warps have the weaved patterns of the same black color.

Embodiment 5

In the concrete Embodiment 5 of the invention, the process was performed in the same manner as that of Embodiment 1 to obtain the water pressure transfer article, except that there was used the transfer film sold by Cubic Co., Ltd. to the licensees of the water pressure transfer technique as the trade name "LINCOLN ZEBRA" instead of the transfer film called "ZEBRA LINE" of the Embodiment 1.

(Comparison 8)

In the Comparison 8, what is in the form of a middle product was obtained in the same manner as the Comparison 1, except that there was used the transfer film sold as the trade name "LINCOLN ZEBRA" instead of the transfer film called "ZEBRA LINE" of the Embodiment 1.

(Comparison 9)

In the Comparison 9, a water pressure transfer article was obtained in the same manner as the Comparison 2, except that there was used the transfer film sold as the trade name "LINCOLN ZEBRA" instead of the transfer film called "ZEBRA LINE" of the Embodiment 1.

As the surface unevenness of the Embodiment 5 and the Comparisons 8 and 9 was measured by the surface unevenness measurement meter manufactured by KOSAKA KENKYUSYO Co., Ltd., in the Embodiment 5, the fine unevenness was observed and the height difference was 0.3 μm, but in the Comparison 8, the fine unevenness was observed and the height difference was 2.8 μm and in the Comparison 9, the fine unevenness was not observed and the height difference was 0.3 μm.

In the Comparison 9 in which the topcoat layer war applied, the surface protection function was obtained by the surface protection layer, but the touch feeling was lost by the topcoat layer and in the Comparison 8 in which the topcoat layer was not applied, but the decorative layer was obtained by the water pressure transfer using the activator of the prior art, the touch feeling was obtained, but the product had no surface protection function, which caused the product to be impractical. On the other hand, in the Embodiment 5 of the invention, the product had both of the surface protection function and the touch feeling and therefore it will be noted that it was suitable for the products such as a steering wheel of a car and so on required to have both properties.

POSSIBILITY OF UTILIZATION IN INDUSTRIES

Since the non-solvent type ultraviolet ray hardening resin for providing the recovery of adhesion of the print pattern to be transferred and is wholly united with the print pattern and hardened, the mechanical and chemical surface protection functions are imparted to the decorative layer and also the ultraviolet ray hardening resin composite is easy or hard to be absorbed in accordance with the kinds of the pigment in the ink of the print pattern whereby the ink printed portion of the decorative layer formed by transferring the print pattern has the low and high glossy pattern portions formed thereon. Thus, there can be provided the product (the water pressure transfer article) adapted to impart the cubic effect to the decorative layer, which is caused by the presence of the difference of glossy degree and therefore the availability in industries can be remarkably improved.

The invention claimed is:

1. An article having a surface protected by a decorative layer comprising a wholly united layer of an ultraviolet ray hardening resin composite absorbed in an ink pattern, the ink pattern absorbing the hardening resin to provide said united layer as a single layer of the combined ink pattern and hardening resin, said united layer being applied to said surface by transfer under water pressure and hardened by ultraviolet irradiation, said ink pattern including adjacent abutting ink pattern portions formed of ink containing ink pigment, said hardening resin being absorbed by said ink portions in amounts corresponding with the amount of ink pigment in said ink pattern portions, one of which contains ink pigment that absorbs greater amounts of hardening resin and the other of which contains ink pigment that absorbs lesser amounts of hardening resin, said adjacent ink pattern portions respectively containing corresponding greater and lesser amounts of absorbed hardening resin, said ink pattern portions containing greater amounts of absorbed hardening resin having a low gloss and said ink pattern portions containing lesser amounts of absorbed hardening resin having a high gloss as compared with said low gloss.

2. The article of claim 1, wherein said ink pattern portions having a low gloss have a glossy degree of less than 20 when measured according to "mirror surface gloss of method 30-60 degree" in Japanese Industrial Standards 28741-1997, and a difference of glossy degree between said ink pattern portions having a low or a high gloss is equal to 10 or more when measured according to "mirror surface gloss of method 30-60 degree" in Japanese Industrial Standards Z8741-1997.

3. The article of claim 1, wherein said hardening resin contains a matting component, which imparts a matting effect to said ink pattern portions having a low gloss or a high gloss.

4. The article of claim 1, wherein said amounts of hardening resin absorbed by said ink pattern portions are determined by:

the resin absorption characteristics of ink pigment present in the ink pattern portion;

the amount of ink pigment present in the ink pattern portion as determined by the ink pigment concentration in the ink and the coating amount of ink applied in the ink pattern portion.

5. The article of claim 1, wherein said ink includes black ink pigment and said hardening resin composite is absorbed by said print pattern in amounts corresponding with the amount of black ink pigment in said ink pattern portions.

6. A water pressure transfer article as in claim 1, wherein said decorative layer has mechanical and chemical surface protection properties and said article does not have a separate protective top coat for said decorative layer.

* * * * *